United States Patent
Fujimoto et al.

(10) Patent No.: US 7,444,377 B2
(45) Date of Patent: Oct. 28, 2008

(54) APPARATUS, METHOD AND PROGRAM FOR SUPPORTING CONVERSATION, AND CONVERSATION SUPPORTING SYSTEM

(75) Inventors: Masakazu Fujimoto, Kanagawa (JP); Manabu Ueda, Kanagawa (JP); Yuichi Ueno, Kanagawa (JP); Motohisa Sodeyoshi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 985 days.

(21) Appl. No.: 10/636,734

(22) Filed: Aug. 8, 2003

(65) Prior Publication Data
US 2004/0205125 A1    Oct. 14, 2004

(30) Foreign Application Priority Data
Feb. 14, 2003    (JP) .............................. 2003-037138

(51) Int. Cl.
*G06F 15/16* (2006.01)
(52) U.S. Cl. .................... 709/206; 715/758; 345/619
(58) Field of Classification Search ................ 709/204, 709/227, 205, 225, 203, 224, 206; 455/41.2, 455/456.2, 456; 379/196; 715/758; 345/619
See application file for complete search history.

(56) References Cited

U.S. PATENT DOCUMENTS

| | | | |
|---|---|---|---|
| 6,349,327 B1 * | 2/2002 | Tang et al. ................... | 709/205 |
| 6,425,012 B1 * | 7/2002 | Trovato et al. ............... | 709/227 |
| 6,690,918 B2 * | 2/2004 | Evans et al. ................. | 455/41.2 |
| 6,742,032 B1 * | 5/2004 | Castellani et al. ........... | 709/224 |
| 7,187,935 B1 * | 3/2007 | Day ........................ | 455/456.2 |
| 7,203,752 B2 * | 4/2007 | Rice et al. ................... | 709/225 |
| 2002/0078150 A1 * | 6/2002 | Thompson et al. .......... | 709/204 |
| 2002/0147766 A1 * | 10/2002 | Vanska et al. ............... | 709/203 |
| 2004/0122895 A1 * | 6/2004 | Gourraud .................... | 709/204 |

FOREIGN PATENT DOCUMENTS

| | | |
|---|---|---|
| JP | A 8-137875 | 5/1996 |
| JP | A 8-161398 | 6/1996 |
| JP | A 9-307868 | 11/1997 |
| JP | A 11-203295 | 7/1999 |
| JP | A 2001-195430 | 7/2001 |
| WO | WO 00/04711 | 1/2000 |

\* cited by examiner

*Primary Examiner*—Jungwon Chang
(74) *Attorney, Agent, or Firm*—Oliff & Berridge, PLC

(57) ABSTRACT

A conversation supporting apparatus for supporting conversation among a plurality of participants in an occasion in which the participants participate, comprises personal information storing unit for storing personal information including at least one characteristic value representing a characteristic of a participant; person identifying unit for detecting presence of a participant, and identifying the detected participant; personal information retrieving unit for retrieving personal information on the participant identified by the person identifying unit from the personal information storing unit; characteristic value extracting unit for extracting a predetermined characteristic value from the personal information retrieved by the personal information retrieving unit; and characteristic value outputting unit for outputting the characteristic value extracted by the characteristic value extracting unit.

20 Claims, 17 Drawing Sheets

| DEVICE ID | USER ID |
|---|---|
| 00:11:22:33:44:55 | 0001 |
| 01:23:45:67:89:AB | 0002 |
| AA:BB:CC:DD:EE:FF | 0003 |
| 10:30:50:70:90:B0 | 0004 |
| 22:44:66:88:AA:CC | 0005 |
| ⋮ | ⋮ |

FIG. 4

| USER ID | AGE | SEX | JOB TYPE |
|---|---|---|---|
| 0001 | 51 | M | STAFF |
| 0002 | 32 | M | SALES |
| 0003 | 43 | F | R & D |
| 0004 | 28 | M | R 6 D |
| 0005 | 37 | F | STAFF |
| ⋮ | ⋮ | ⋮ | ⋮ |

FIG. 5

SALES
   0002   0006

R & D

STAFF
   0005   0008   0021

FIG. 6

| USER ID | AGE | | SEX | | JOB TYPE | | QUESTIONNAIRE | | | | | VISIT HISTORY | | | | |
|---|---|---|---|---|---|---|---|---|---|---|---|---|---|---|---|---|
| | | | | | | | 1 | 2 | 3 | 4 | 5 | 1 | 2 | 3 | 4 | 5 |
| 0001 | 51 | 0 | M | 0 | STAFF | 1 | 0 | 2 | 3 | 4 | 1 | 1 | 2 | 3 | 4 | 2 |
| 0002 | 32 | 1 | M | 1 | SALES | 1 | 0 | 0 | 0 | 0 | 1 | 0 | 0 | 0 | 0 | 2 |
| 0003 | 43 | 2 | F | 2 | R & D | 1 | 4 | 2 | 3 | 0 | 1 | 0 | 1 | 1 | 0 | 2 |
| 0004 | 28 | 2 | M | 0 | R & D | 1 | 1 | 3 | 3 | 4 | 1 | 1 | 1 | 1 | 1 | 2 |
| 0005 | 37 | 2 | F | 1 | STAFF | 1 | 0 | 0 | 0 | 0 | 1 | 1 | 0 | 0 | 0 | 2 |
| ... | ... | | ... | | ... | | ... | ... | ... | ... | ... | ... | ... | ... | ... | ... |

FIG. 13

QUESTIONNAIRE

SELECT EVALUATION OF SPACE 1

511

| SELECT ▼ |
| SELECT |
| VERY GOOD |
| GOOD |
| FAIR |
| POOR |
| VERY POOR |

OF SPACE 2

SELECT EVALUATION OF SPACE 3

| SELECT ▼ |

SELECT EVALUATION OF SPACE 4

| SELECT ▼ |

512

[REGISTER]  [CLEAR]

FIG. 14

| USER ID | AGE | SEX | JOB TYPE | QUESTIONNAIRE | | | | | | | VISIT HISTORY | | | | |
|---|---|---|---|---|---|---|---|---|---|---|---|---|---|---|---|
| | | | | 1 | 2 | 3 | 4 | 1 | 1 | 1 | 1 | 2 | 3 | 4 | |
| 0001 | 51 | M | 0 | STAFF | 1 | 0 | 2 | 3 | 4 | 1 | 1 | 0 | 0 | 0 | 2 |
| 0002 | 32 | M | 1 | SALES | 1 | 0 | 2 | 3 | 0 | 1 | 0 | 1 | 1 | 0 | 2 |
| 0003 | 43 | F | 2 | R & D | 1 | 4 | 3 | 3 | 4 | 1 | 1 | 1 | 1 | 1 | 2 |
| 0004 | 28 | M | 0 | R & D | 1 | 1 | 0 | 0 | 0 | 1 | 1 | 0 | 0 | 0 | 2 |
| 0005 | 37 | F | 1 | STAFF | 1 | 3 | 0 | 0 | 2 | 1 | 1 | 0 | 0 | 0 | 2 |
| ... | ... | ... | ... | ... | ... | ... | ... | ... | ... | ... | ... | ... | ... | ... | ... |

FIG. 15

| USER ID | AGE | | SEX | | JOB TYPE | | QUESTIONNAIRE | | | | | VISIT HISTORY | | | | |
|---|---|---|---|---|---|---|---|---|---|---|---|---|---|---|---|---|
| | | | | | | | 1 | 2 | 3 | 4 | | 1 | 2 | 3 | 4 | |
| 0001 | 51 | 0 | M | 0 | STAFF | 1 | 0 | 2 | 3 | 4 | 1 | 0 | 2 | 3 | 4 | 2 |
| 0002 | 32 | 1 | M | 1 | SALES | 1 | 0 | 2 | 0 | 0 | 2 | 0 | 0 | 0 | 0 | 2 |
| 0003 | 43 | 2 | F | 2 | R & D | 1 | 4 | 3 | 3 | 0 | 1 | 0 | 1 | 1 | 0 | 2 |
| 0004 | 28 | 2 | M | 0 | R & D | 1 | 1 | 0 | 0 | 4 | 1 | 1 | 1 | 1 | 1 | 2 |
| 0005 | 37 | 2 | F | 1 | STAFF | 1 | 3 | 0 | 0 | 2 | 1 | 1 | 0 | 0 | 0 | 2 |
| ... | ... | ... | ... | ... | ... | ... | ... | ... | ... | ... | ... | ... | ... | ... | ... | ... |

FIG. 17

| USER ID | AGE | | SEX | | JOB TYPE | | QUESTIONNAIRE | | | | | | VISIT HISTORY | | | | |
| --- | --- | --- | --- | --- | --- | --- | --- | --- | --- | --- | --- | --- | --- | --- | --- | --- | --- |
| | | | | | | | 1 | 2 | 3 | 4 | 5 | 6 | 1 | 2 | 3 | 4 | 5 |
| 0001 | 51 | 0 | M | 0 | STAFF | 1 | 0 | 2 | 3 | 4 | 1 | 1 | 1 | 2 | 3 | 4 | 2 |
| 0002 | 32 | 1 | M | 1 | SALES | 1 | 0 | 0 | 0 | 0 | 2 | 1 | 1 | 0 | 0 | 0 | 2 |
| 0003 | 43 | 2 | F | 2 | R & D | 1 | 4 | 2 | 3 | 0 | 1 | 0 | 0 | 1 | 1 | 0 | 2 |
| 0004 | 28 | 2 | M | 0 | R & D | 1 | 1 | 3 | 3 | 4 | 2 | 1 | 1 | 1 | 1 | 1 | 2 |
| 0005 | 37 | 2 | F | 1 | STAFF | 1 | 3 | 0 | 0 | 0 | 1 | 1 | 1 | 0 | 0 | 0 | 2 |
| ... | ... | ... | ... | ... | ... | ... | ... | ... | ... | ... | ... | ... | ... | ... | ... | ... | ... |

FIG. 18

APPARATUS, METHOD AND PROGRAM FOR SUPPORTING CONVERSATION, AND CONVERSATION SUPPORTING SYSTEM

BACKGROUND OF THE INVENTION

1. Field of the Invention

The present invention relates to an apparatus, a method and a program for supporting conversation, and a conversation supporting system, and especially relates to an apparatus, a method and a program for supporting conversation, and a conversation supporting system capable of changing information to be provided according to situations of a person and a meeting place so as to support conversation.

2. Related Art

Recently, importance of an informal personal network referred to as community has been noted in corporate organizations and the like. The reason is that informal conversations other than conversations in formal meetings help to promote smooth progress in activities of the organizations.

The informal conversation takes place in such places as the neighborhood of a personal desk, cafeteria, restaurant and hallway, and plays an important role for forming an informal network. The informal conversation serves as a source for inspiring a new hint or expanding an idea, for example.

To initiate informal conversation, a person to talk with is necessary. For example, in a crowded store or train, even if a person whom one wants to talk with is present within the same space, it cannot be recognized that the person is close to him/her, and thus missing a chance of conversation with the person. Also, in communication other than face-to-face communication, such as communication over telephone, one cannot tell situations of a called party; whether a called party can answer a phone call or whether the called party is currently on another phone, until one actually calls, or whether the called party is not near the phone by chance and will return soon, or is out and cannot answer the phone for a while, even after one makes a phone call and no one answers the call. Therefore, conversation is difficult to take place unless one knows such situations of the other party.

To cope with the foregoing situations, an apparatus which uses a camera to take images of the situation of a receiving party to communicate with, converts the situation image into information representing the situation, and transmits the information while privacy is protected is proposed (see Japanese Patent publication (Kokai) H9-307868, for example).

Additionally, the informal conversation has such an aspect that it does not take place unless one happens to be present in the same meeting place where a person to talk with is present, and it hardly occurs unless they know each other. This also applies to the communication on a communication network in which the above-mentioned same please is not a physically same meeting place.

Thus, a service is proposed which causes an encounter with other users in a virtual space to give a chance of accidental communication (see Japanese Patent publication (Kokai) H8-161398, for example).

In addition, informal conversation does not start until a participant to the conversation makes any utterance or speech. As art of encouraging speaking to activate conversation among participants, an apparatus is proposed which presents an interesting data and the like to a person who has not spoken in a meeting so as to prompt the person to speak (see Japanese Patent publication (Kokai) H8-137875, for example).

Further, even though informal conversation started, if subject to talk is scarce, it is highly probable that the conversation does not continue, and ends up with as much as greeting. As art of supporting the provision of subjects, an apparatus is proposed which provides information relating to a subject without interrupting conversation during the conversation (see Japanese Patent publication (Kokai) H11-203295, for example)

Additionally, as related art in addition to the above-mentioned art, a system is proposed where agents for users are utilized to mutually transmit relationship among history information such as knowledge and experience, and the agents automatically detect commonness and difference between the users in terms of history information and evaluation information by the users relating to the history information (see Japanese Patent publication (Kokai) 2001-195430, for example).

However, although the configuration disclosed in Japanese Patent publication (Kokai) H9-307868 described above provides such an effect that whether a person with whom one intends to talk is absent or not, and whether the person is available are informed, the configuration does not handle such a case as finding an available person among unacquainted people who is familiar with a subject which one wants hear about or to talk about, and therefore, it is insufficient for one to recognize a situation according to one's purpose. Also, this configuration is insufficient for one to recognize a situation when one wants to determine whether to participate in conversation or not, or whether to join a session of the conversation.

The configuration disclosed in Japanese Patent publication (Kokai) H8-161398 is limited to over a communication network. Further, it is not a service intended for conversation, and does not directly lead to supporting the inspiration in conversation.

The configuration disclosed in Japanese Patent publication-(Kokai) H8-137875 requires monitoring speech to examine the situation of the speech. Therefore, the configuration is not suited for supporting informal conversation such as chatting which may take place anywhere.

The configuration disclosed in Japanese Patent publication (Kokai) H11-203295 only identifies and provides information relating to the same subject, and is not sufficient for providing different types of subject and information for expanding the inspiration in conversation.

The configuration disclosed in Japanese Patent publication (Kokai) 2001-195430 only saves the labor of comparing information among users, and is insufficient for a support to initiate conversation and to keep the conversation in progress.

As described above, the prior art is mostly insufficient for supporting informal conversation. However, if one is provided with awareness information such as information as to who are present in a meeting place and where informal conversation is possible, one can go to a meeting place where specific persons to talk with are present, or, in case one does not care talking with anybody, to a meeting place where somebody to talk with is present. As a result, informal conversation can be easily taken place in such meeting places.

However, providing the awareness information may cause a violation of privacy depending on what is provided.

SUMMARY OF THE INVENTION

The present invention has been made in view of the above circumstances and provide an apparatus, a method and a program for supporting conversation, and a conversation supporting system, which can supply only a part of private information and meeting place information kept as intact or after processed so as to provide information which supports the occurrence and continuation of informal conversation, while providing privacy and awareness.

According to an aspect of the present invention, a conversation supporting apparatus for supporting conversation among a plurality of participants in an occasion in which the participants participate, comprises personal information storing unit for storing personal information including at least one characteristic value representing a characteristic of a participant; person identifying unit for detecting presence of a participant, and identifying the detected participant; personal information retrieving unit for retrieving personal information on the participant identified by the person identifying unit from the personal information storing unit; characteristic value extracting unit for extracting a predetermined characteristic value from the personal information retrieved by the personal information retrieving unit; and characteristic value outputting unit for outputting the characteristic value extracted by the characteristic value extracting unit.

According to another aspect of the present invention, a conversation supporting method for supporting conversation among a plurality of participants in an occasion in which the participants participate, comprising the steps of detecting presence of a participant; identifying the detected participant; retrieving personal information on the identified participant; extracting a predetermined characteristic value from the retrieved personal information; and displaying the extracted characteristic value.

According to still another aspect of the present invention, a conversation supporting program for supporting conversation among participants in an occasion in which multiple participants participate, the program comprising a person identifying step of identifying a participant detected by detecting unit that detects presence of the participant; a personal information retrieving step of retrieving personal information on the participant identified by the person identifying step from personal information storing unit that stores personal information including at least one characteristic value representing a characteristic of the participant; a characteristic value extracting step of extracting a predetermined characteristic value from the personal information retrieved by the personal information retrieving step; and a characteristic value outputting step of outputting the characteristic value extracted by the characteristic value extracting step to outputting unit.

According to yet another aspect of the invention, a conversation supporting system for supporting conversation among participants in an occasion in which multiple participants participate, comprises a first apparatus including person identifying unit for detecting presence of a participant, and identifying the detected participant; a second apparatus including personal information storing unit for storing personal information including at least one characteristic value representing a characteristic of a participant, personal information retrieving unit for retrieving personal information of the participant identified by the person identifying unit from the personal information storing unit, and characteristic value extracting unit for extracting a predetermined characteristic value from the personal information retrieved by the personal information retrieving unit; and a third apparatus including characteristic value outputting unit for outputting the characteristic value extracted by the characteristic value extracting unit, wherein the first apparatus, the second apparatus and the third apparatus are connected to each other through a network.

The present invention is constructed such that presence of a participant is detected, the detected participant is identified, personal information on the identified participant is retrieved, and a predetermined characteristic value is extracted from the retrieved personal information and is output. This construction allows one to aware a person who is unacquainted, and therefore in the past cannot be a person to talk with, as a person to talk with so that chances of conversation increase and it is possible to select a person to talk with who fits a purpose.

Further, the present invention is constructed to limit that the content and the extent of the personal information to be disclosed. This construction can prevent unintended personal information from being leaked, and at the same time, it is possible to promote the conversation since it makes one to try to make up the limited portion by the conversation.

BRIEF DESCRIPTION OF THE DRAWINGS

Preferred embodiments of the present invention will be described in detail based on the following figures, wherein:

FIG. 4 shows an example of a table used for converting a device ID to a user ID;

FIG. 5 shows an example of personal information managed by a personal information storing unit in FIG. 1;

FIG. 6 shows an example of an output of characteristic values;

FIG. 13 shows an example of personal information stored in a personal information storing unit in FIG. 10;

FIG. 14 shows an example of a screen for filling a questionnaire shown on a portable terminal in FIG. 11;

FIG. 15 shows an example of the personal information after the questionnaire is filled;

FIG. 17 shows an example of the personal information after the access control method is changed; and FIG. 18 shows an example of the personal information after a change based on visit history.

DESCRIPTION OF THE EMBODIMENTS

Referring to the accompanying drawings, embodiments of an apparatus, a method and a program for supporting conversation, and a conversation supporting system according to the present invention are detailed.

Figure 1:
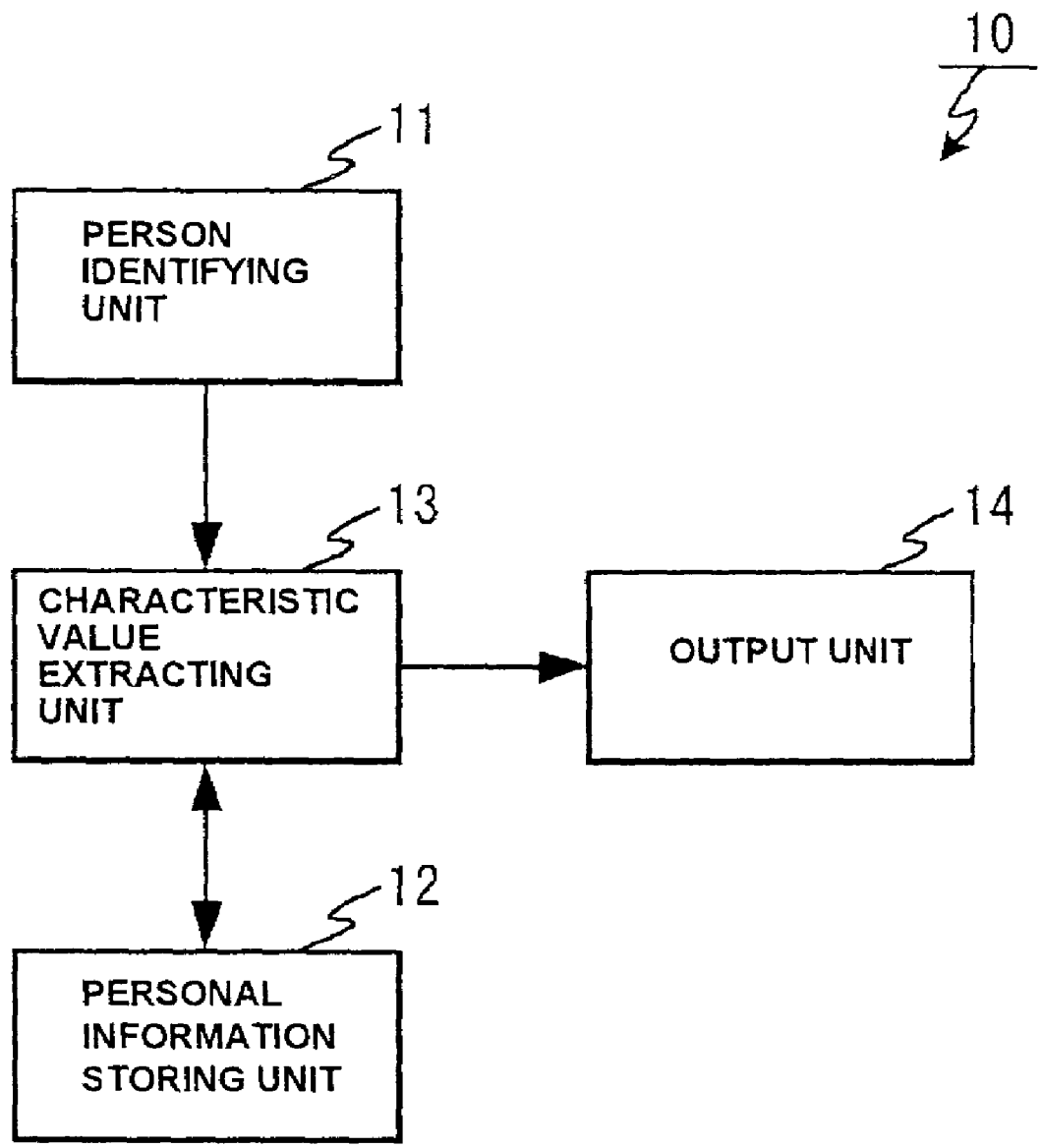
FIG. 1 is a block diagram showing the functional configuration of an embodiment of a conversation supporting apparatus to which the present invention is applied.

FIG. 1 is a block diagram showing the functional configuration of an embodiment of a conversation supporting apparatus to which the present invention is applied. As shown in FIG. 1; the conversation supporting apparatus 10 comprises a person identifying unit 11, a personal information storing unit 12, a characteristic value extracting unit 13, and an output unit 14.

The person identifying unit 11 identifies a visitor (participant) to a meeting place (site) where conversation is supported by the conversation supporting apparatus 10. The person identifying unit 11 may be in any configuration; whether it is of contact or non-contact type, such as an RFID (Radio Frequency Identification), an infrared badge, and a device for radio communication as long as it can be used as a sensor for identifying an individual person.

The personal information storing unit 12 is a database for storing information relating to individual visitors. All of the stored information may be only information stored in advance, or, in addition to the information stored in advance, data that a user input or date on behavioral history of a user may be stored automatically each time it occurs.

The characteristic value extracting unit 13 extracts a characteristic value of a meeting place which a visitor visits, or a characteristic value of a visitor, and has at least a function for controlling or limiting information to be disclosed such as a function of hiding a name and the like. Further, the characteristic value extracting unit 13 may realize a function of generating a statistical result such as a male/female ratio or an age distribution in addition to simply filtering information.

The output unit 14 serves to present the characteristic value extracted by the characteristic value extracting unit 13, and comprises an ordinary display apparatus or projector to show the information in the form of character information and image information.

Figure 2:
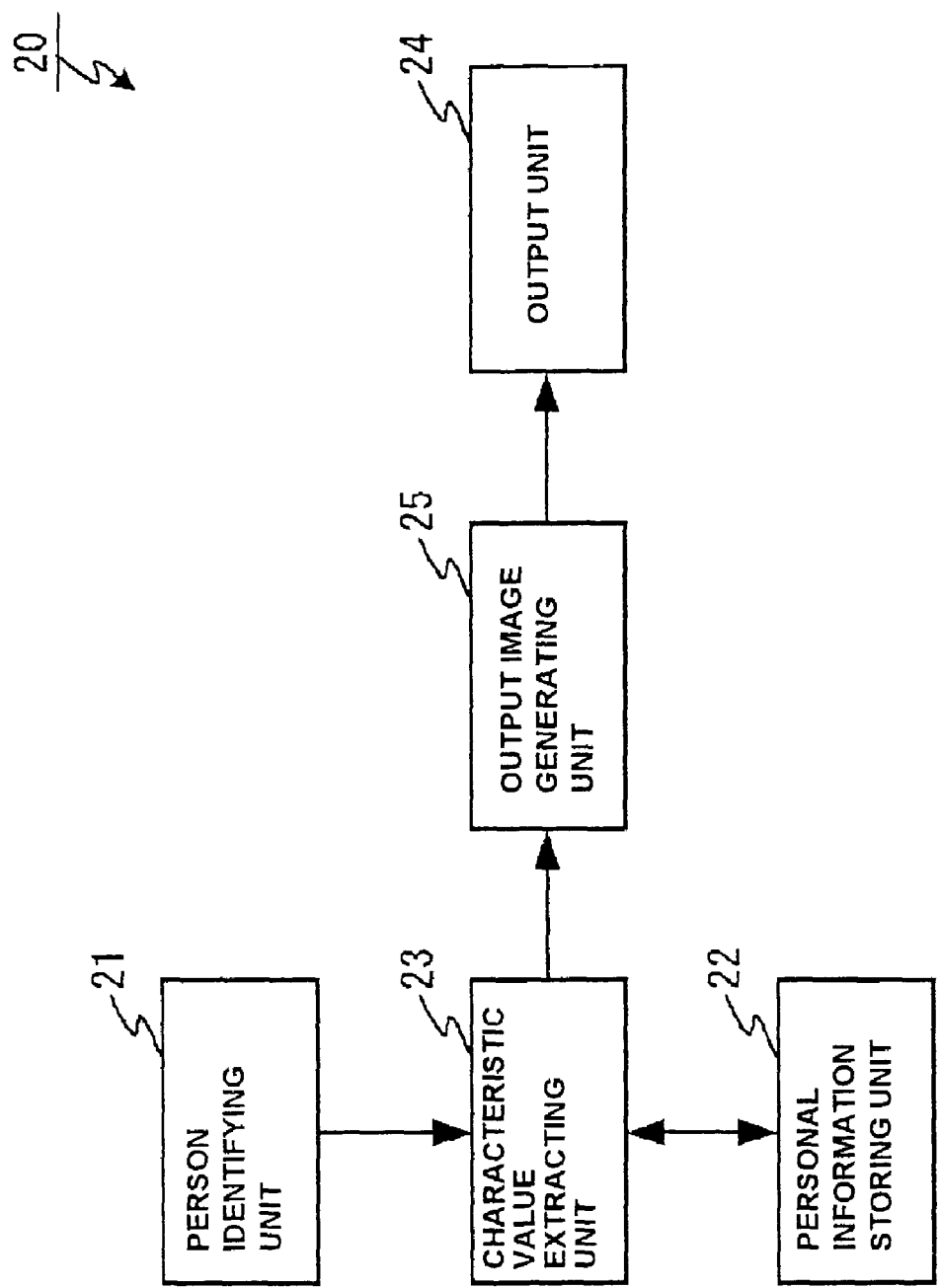
FIG. 2 is a block diagram showing the functional configuration of a modification of the conversation supporting apparatus in FIG. 1.

Alternatively, a conversation supporting apparatus may include an output image generating unit 25, which serves to convert the characteristic value so as to be easier to understand when it is visualized, and outputs the converted value from the output unit 24 in addition to or in place of simply outputting the characteristic value. Such a conversation supporting apparatus is shown in FIG. 2 as a conversation supporting apparatus 20. Note that a person identifying unit 21, a personal information storing unit 22, a characteristic value extracting unit 23, and the output unit 24 constituting the conversation supporting apparatus 20 respectively correspond to the person identifying unit 11, the personal information storing unit 12, the characteristic value extracting unit 13, and the output unit 14 of the conversation supporting apparatus 10.

Also, note that the conversation supporting unit 10 and the conversation supporting unit 20 may be constructed by a dedicated hardware device, or may be realized by software using a computer and its peripherals.

Figure 3:
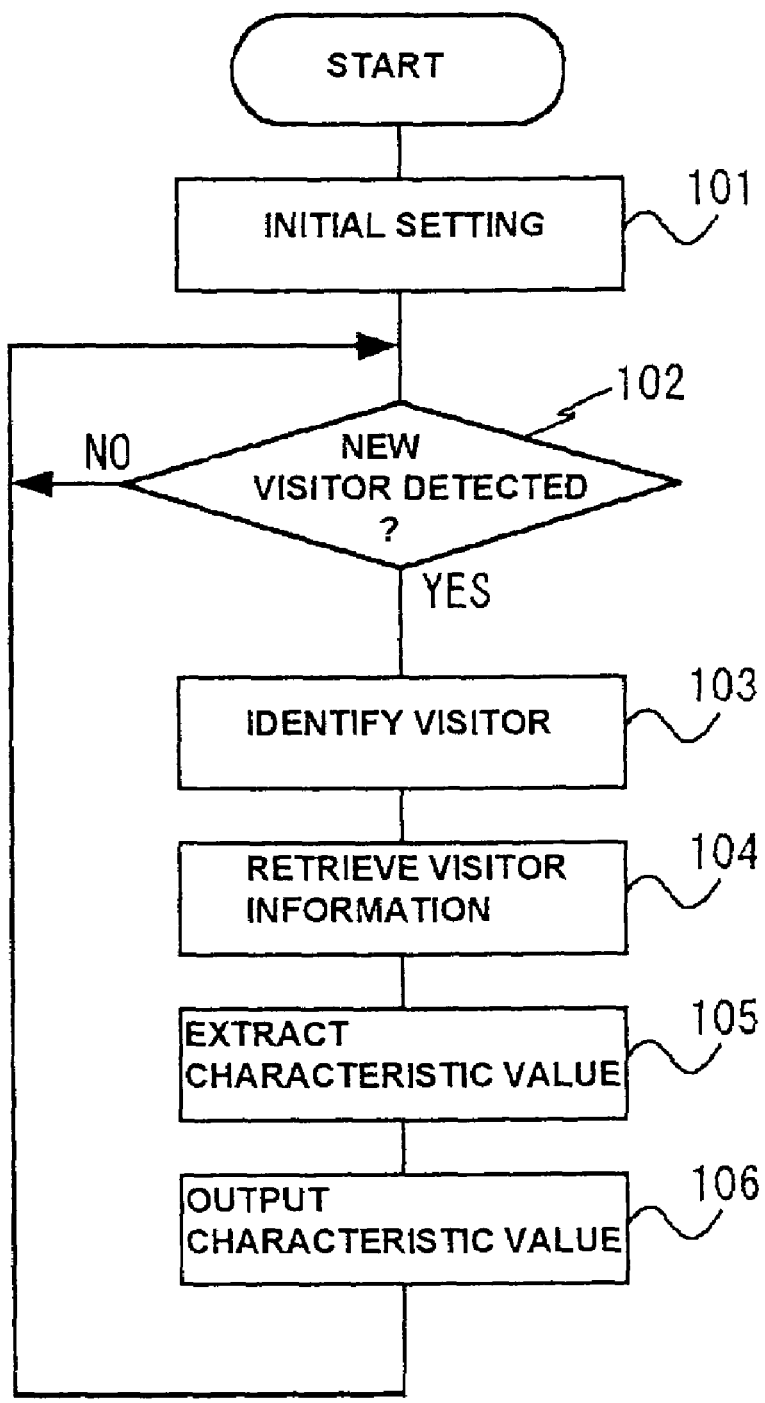
FIG. 3 is a flowchart showing the flow of the operation of the conversation supporting apparatus in FIG. 1.

The operations of the conversation supporting apparatus 10 is now described while referring to FIG. 3 which is a flowchart showing the flow of the operations of the conversation supporting apparatus 10.

The conversation supporting apparatus 10 first conducts an initial setting based on the operation by an administrator or the like after it starts operating (Step 101). The initial setting conducted here includes setting of the type of the characteristic value extracted by the characteristic value extracting unit 13, and the form of the output from the output unit 14.

Then, the person identifying unit 11 operates to detect a new visitor (Step 102), which is repeated until a new visitor is detected (NO for Step 102).

When a new visitor is detected (YES for Step 102), the person identifying unit 11 identifies the detected visitor (Step 103). The visitor is identified by detecting a device ID of a device carried by the visitor such as an RFID, and converting the device ID to a user ID. As for the device ID, even if a device for other applications such as a device for radio communication is used, since a MAC (Media Access Control Address) is assigned, the MAC address can be used as the device ID. The device ID is converted to the user ID by using a table shown in FIG. 4, for example. In the example shown in FIG. 4, when a device whose device ID is represented in hexadecimal as "01:23:45:67:89:AB" is detected, the user ID of a user carrying this device is identified as "0002".

After the person identifying unit 11 identifies the visitor, the characteristic value extracting unit 13 retrieves information on the identified visitor from the personal information stored in the personal information storing unit 12 (Step 104). The personal information storing unit 12 manages the personal information by associating the user ID with the personal information as shown in FIG. 5, for example. Therefore, the personal information can be retrieved by using the user ID as a key. As a result, for a visitor whose user ID is "0002", for example, personal information; "32 years old, male, salesman" is retrieved. Note that the personal information stored in the personal information storing unit 12 is not limited to such items as age, sex, and job type as shown in FIG. 5. The personal information may be any items that can be used as the personal information such as name, address, and face photograph may be used.

After the characteristic value extracting unit 13 retrieves the personal information on the visitor, it extracts a required characteristic value from the retrieved result (Step 105). If the required characteristic value, which is set as the initial setting in Step 101, is set to "Job Type", "Salesman" is extracted as the characteristic value of the visitor whose user ID is "0002". Note that the characteristic value to be extracted may not be a single item, but may be multiple items such as "Job Type" and "Sex". Also, the extracted characteristic value may not be a data itself, but may be a calculated ratio of "Salesman" to the entire visitors, for example. Further, it may be accumulated information on entire visitors who have ever visited, or information on entire users presently detected, or information on only a user detected last.

Then, the output unit 14 outputs the characteristic value (Step 106) and is displayed on a display or the like, which is not shown. For example, as shown in FIG. 6, numbers of people detected for each "Job Type" are displayed. The example shown in FIG. 6 indicates that two visitors in the sales division and three visitors in the staff division are currently present in a room where the conversation supporting apparatus 10 exists, and the user ID's of the visitors are also shown. By observing the displayed result, even if a visitor whose user ID is "0002" does not know the entire users at the same meeting place at all, the visitor can find appropriate persons. For example, if the visitor wants to hear opinions from other salesman visitors, the visitor can find the users having the user ID "0006" to talk to, or if the visitor wants to hear opinions from visitors in staff division, the visitor can find the users having the user ID "0005", "0008", and "0021" to talk to. Note that, since this output result shows only the required characteristic value, and does not allow to identify any person directly, the privacy of the users can be protected.

Figure 7:
FIG. 7 shows another example of the output of the characteristic values.

While the description above is made for the conversation supporting apparatus 10, the conversation supporting apparatus 20 operates in a similar way. In the conversation supporting apparatus 20, since the information output form the image generating unit 25 is visualized, the displayed image may be as shown in FIG. 7 in place of the displayed image as shown in FIG. 6.

Note that the display of the characteristic value does not have to take the display form as described above. The display may be a color of illumination of the room or the like. For example, to represent the characteristic values as shown in FIG. 6, when a color in RGB combination for the "sales" is set to (255, 0, 0), a color for the "staff" is set to (0, 255, 0), and a color for "research and development" is set to (0, 0, 255), then the color (102,153,0), which is a slightly yellowish green, is obtained by taking an average value of the RGB combination after multiplying the colors by the number of people engaged in the respective job types. This color (102, 153, 0) is roughly represents the ratio of the job types in the entire room, and enables recognition of the atmosphere of the occasion taking place in the room.

For easiness of understanding the operation of the conversation supporting apparatus 10, the above description is made only for a case where the person identifying unit 11 detects a new visitor. In reality, however, the person identifying unit 11 also detects exit of visitors.

Figure 8:
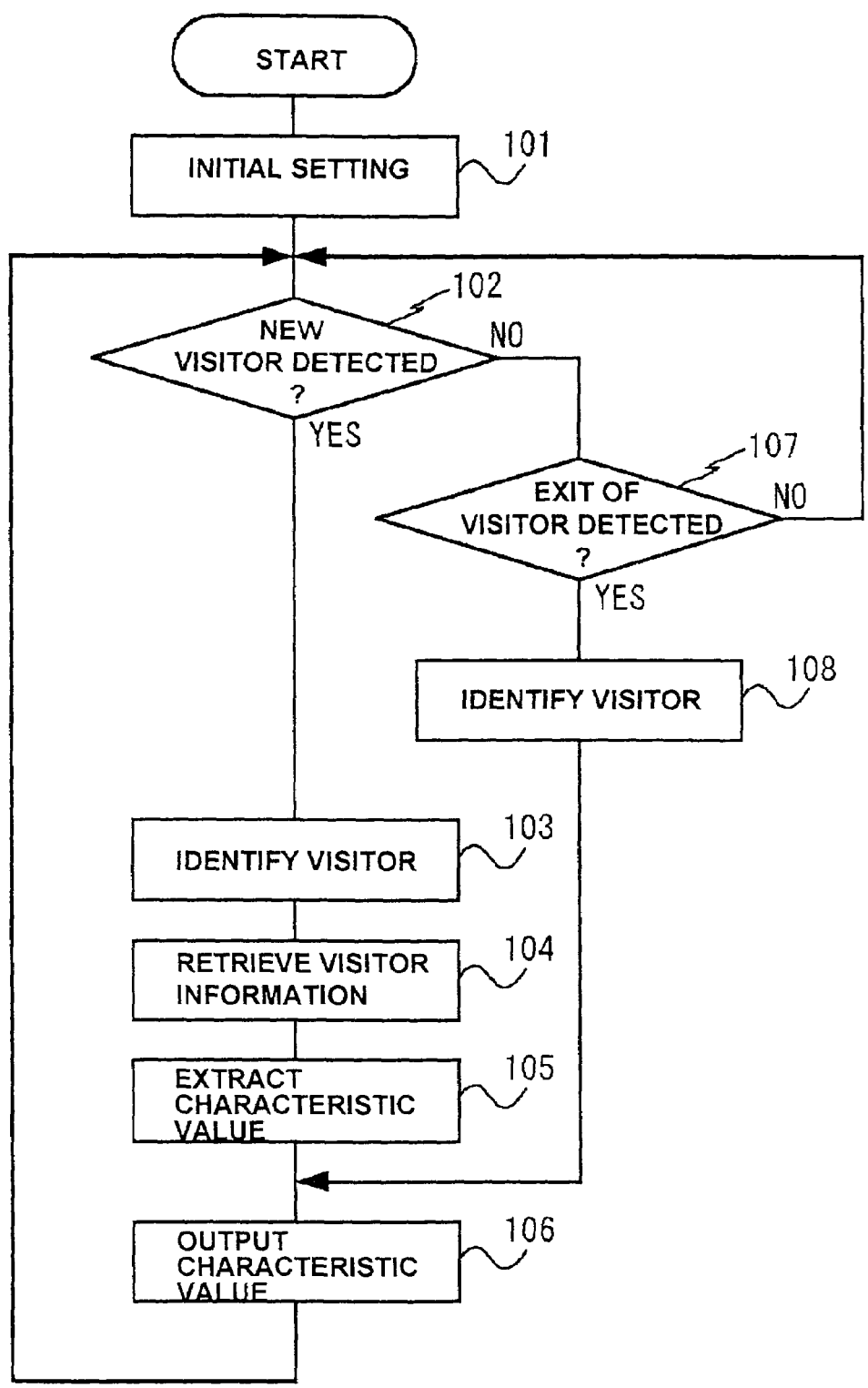
FIG. 8 is a flowchart showing the flow of the operation of the conversation supporting apparatus in FIG. 1 when an exiting person is detected.

FIG. 8 is a flowchart showing the flow of the operation of the conversation supporting apparatus 10 when an exiting person is detected. In FIG. 8, operations conducted in steps to which the same numerals as those in FIG. 3 are assigned are the same operations conducted in FIG. 3. In FIG. 8, when an exiting person is detected (YES for Step 107), the exiting visitor is identified (Step 108). Of course, in Step 106, the characteristic value is output for those excluding the exiting people.

As for detecting an exiting visitor, when the conversation supporting apparatus 10 is configured to detect visitors from the entire room, a visitor who is no longer detected is considered as having exited, and when the conversation supporting apparatus 10 is configured to detect visitors only at an entrance of the room, visiting and exiting are determined for every detection at the entrance.

The following describes another embodiment of the apparatus, the method and the program for supporting conversation, and the conversation supporting system according to the present invention.

Figure 9:
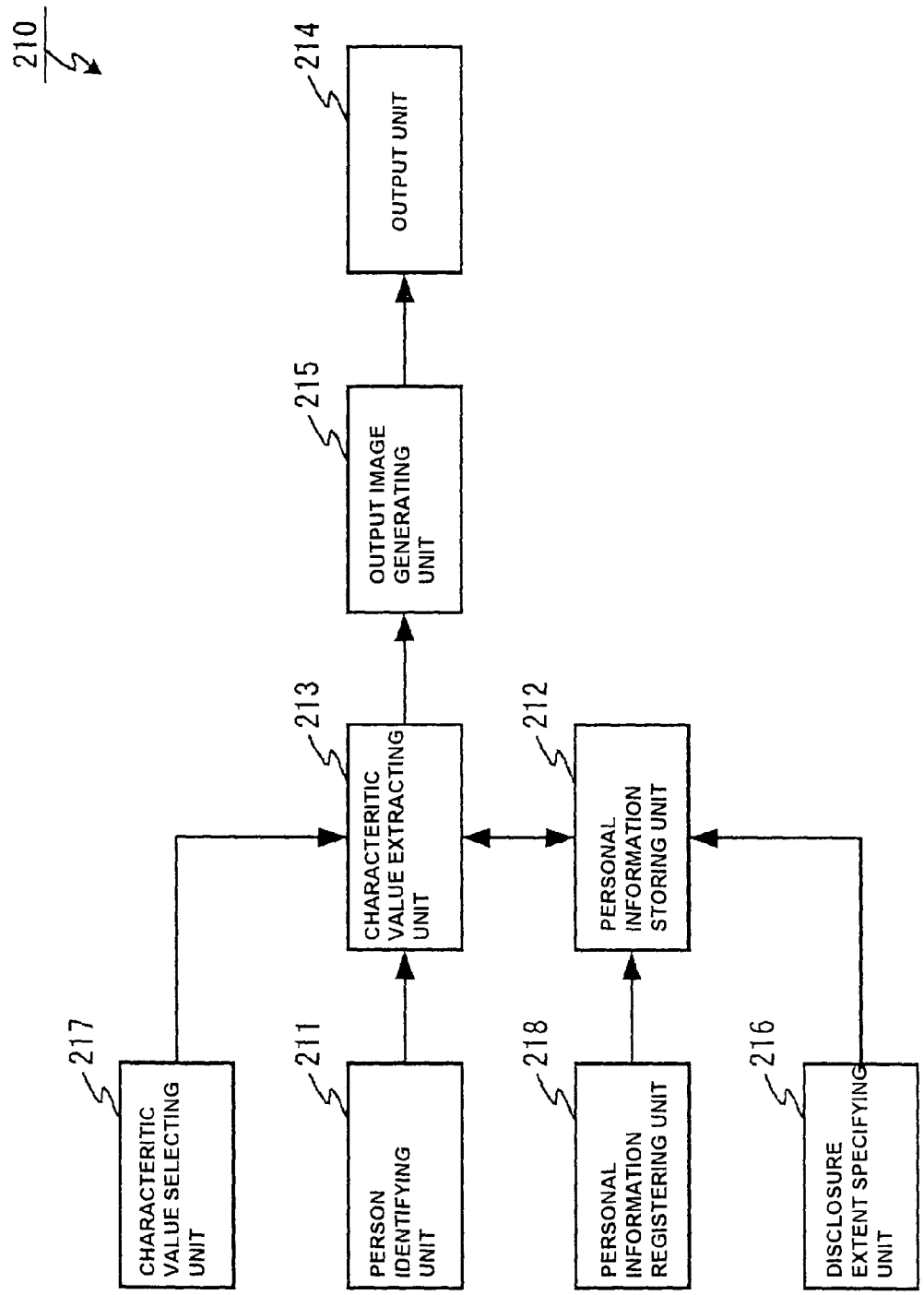
FIG. 9 is a block diagram showing the functional configuration of a conversation supporting apparatus according to the second embodiment.

FIG. 9 is a block diagram showing the functional configuration of a conversation supporting apparatus according to the second embodiment. As shown in FIG. 9, the conversation supporting apparatus 210 comprises a person identifying unit 211, a personal information storing unit 212, a characteristic value extracting unit 213, an output unit 214, an output image generating unit 215, a disclosure extent specifying unit 216, a characteristic value selecting unit 217, and a personal information registering unit 218. The person identifying unit 211, the personal information storing unit 212, the characteristic value extracting unit 213, the output unit 214, and the output image generating unit 215 of the second embodiment respectively correspond to and have the same configuration as the person identifying unit 11 (21), the personal information storing unit 12 (22), the characteristic value extracting unit 13 (23), the output unit 14 (24), and the output image generating unit 25 of the first embodiment. Therefore, detailed description on those components is not provided.

The disclosure extent specifying unit 216 sets an extent of disclosing the personal information based on an access code, etc. by specifying the access control method using a password or a keyword. Instead of using password or keyword, the access control may be specified by using the personal information of a requesting person such as the user ID. Further, the access control method may be specified for each of the items in the personal information, so that, for example, only a user can access his or her own name, a member whose ID is specified can read and write a remark column, and the job type can be read out only when an access code of "public" is entered.

The characteristic value selecting unit 217 serves to enable a user who is requesting a disclosure of information to select and indicate characteristic values which the user requests to be disclosed, and may use a menu for selecting items such as age, sex, and job type, or input an user ID of a person whose information is requested to be disclosed, or input an access code passed from a person whose additional information is requested to be disclosed. The access code is a code for determining whether information on a specific person is accessible, and the access is controlled according to a specified password or keyword. For example, for a user whose user ID is "0001", a password of "all-info" is set as an access code for accessing entire information, a password of "public" is set as an access code for accessing a part of the information, and no password is set to show only the user ID. Then, a user requesting disclosure of the information is required to give an access code and to specify the access code, and an instruction is transmitted to the characteristic value extracting unit 213 so as to provide only characteristic values corresponding to the access code.

The personal information registering unit 218 registers information to the personal information storing unit 212, and adds or modifies the information. The personal information storing unit 212 may be so configured that the information to be added or modified can be used not only in a situation where an error in personal information or obsolete and useless information is rewritten, but also in situations where sensors for identifying a person are disposed at various meeting places, and output information from these sensors is recorded as a personal behavior history, or where information which a user wants to input according to a meeting place or a situation such as an answer to a questionnaire or impression of an experienced event is registered, for example.

Figure 10:
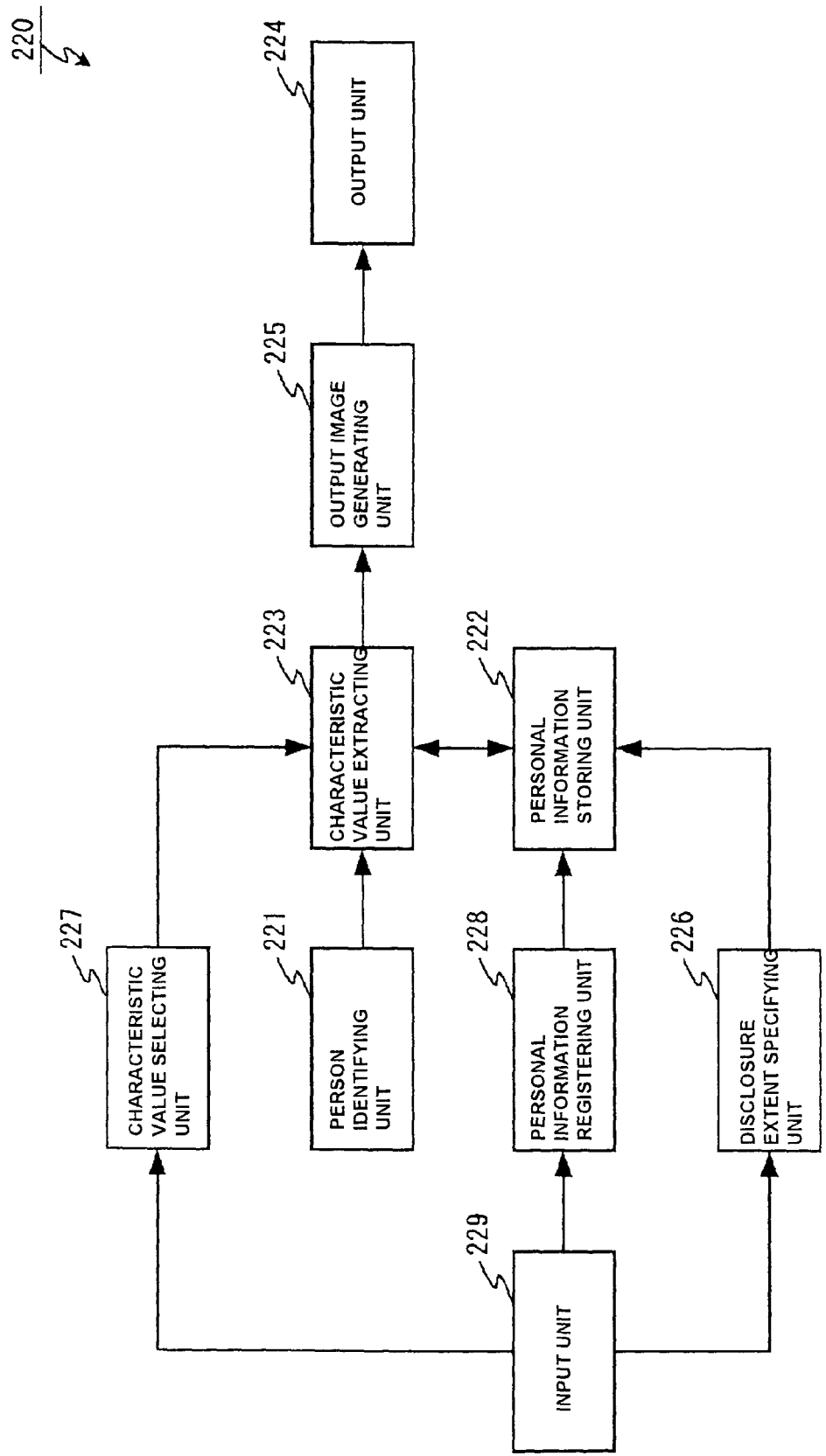
FIG. 10 is a block diagram showing the functional configuration of a modification of the conversation supporting apparatus according to the second embodiment.

In a conversation supporting apparatus 220 shown in FIG. 10, an input unit 229 constituted by a keyboard, a mouse, or the like may be shared among a disclosure extent specifying unit 226, a characteristic value selecting unit 227, and a personal information registering unit 228. Note that a person identifying unit 221, a personal information storing unit 222, a characteristic value extracting unit 223, an output unit 224, an output image generating unit 225, the disclosure extent specifying unit 226, the characteristic value selecting unit 227, and the personal information registering unit 228 constituting the conversation supporting apparatus 220 respectively correspond to the person identifying unit 211, the personal information storing unit 212, the characteristic value extracting unit 213, and the output unit 214, the output image generating unit 215, the disclosure extent specifying unit 216, the characteristic value selecting unit 217, and the personal information registering unit 218 of the conversation supporting apparatus 210.

The conversation supporting apparatus to which the present invention is applied may be constructed on a server/client system connected through a network in addition to the configuration as an independent apparatus.

Figure 11:
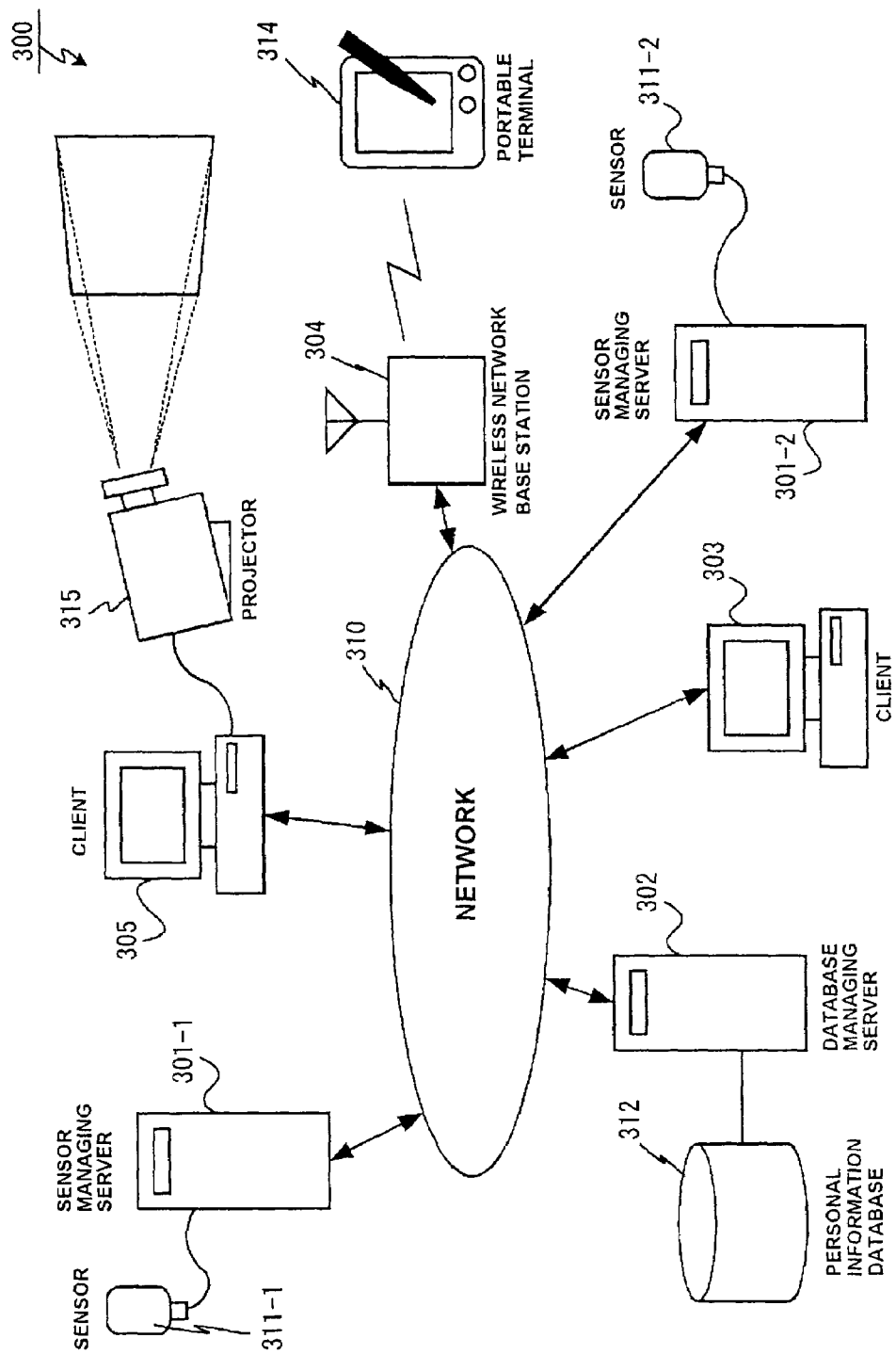
FIG. 11 shows an example of the configuration of a conversation supporting system constructed on a server/client system.

FIG. 11 shows an example of the configuration of a conversation supporting system constructed on a server/client system. As shown in FIG. 11, in a conversation supporting system 300, sensor managing server 301-1, a sensor managing server 301-2, a database managing server 302, a client 303, a wireless network base station 304, and a client 305 are connected with a network 310.

A sensor 311-1 and a sensor 311-2 are respectively connected with the sensor managing server 301-1 and the sensor managing server 301-2, and a personal information database 312 is connected with the database managing server 302. A portable terminal 314 is connected with the wireless network base station 304, and a projector 315 is connected with the client 305.

When the conversation supporting system 300 is compared with the conversation supporting apparatus 220, the sensor managing server 301-1 and the sensor 311-1, and the sensor managing server 301-2 and the sensor 311-2 of the conversation supporting system 300 correspond to the person identifying unit 221 of the conversation supporting apparatus 220. The database managing server 302 uses programs to realize the characteristic value extracting unit 223, the output image generating unit 225, the disclosure extent specifying unit 226, the characteristic value selecting unit 227, and the personal information registering unit 228 of the conversation supporting apparatus 220. The personal information database 312 operates as the personal information storing unit 222 of the conversation supporting apparatus 220.

The client 303 and the portable terminal 314 such as a cellular phone and a PDA Personal Digital Assistance) operate as the input unit 229. In this case, when the database managing server 302 is operating a Web server, and is operating the individual programs described above as Web applications, no specific software is necessary for the client 303 and the portable terminal 314, and a general-purpose Web browser is employed to use them as the input terminal 229. The client 305 operates as the output unit 224, and outputs an output image to the projector 315, and the portable terminal 314 also operates as the output unit 224 in addition to operating as the input unit 229.

Since this conversation supporting system 300 can be constructed so that the individual parts are dispersedly located, the system is especially effective in a case such as a party site where setting up the site is necessary, and thus, the conversation supporting apparatus cannot be permanently disposed. Also, when the system is used in an organization such as a company, in which the sensors 311 and the projectors 315 are disposed dispersedly at multiple meeting places and the conversation supporting processing is conducted at these multiple meeting places, the system can be configured so that the database managing server 302 and the personal information database 312 are shared.

Figure 12:
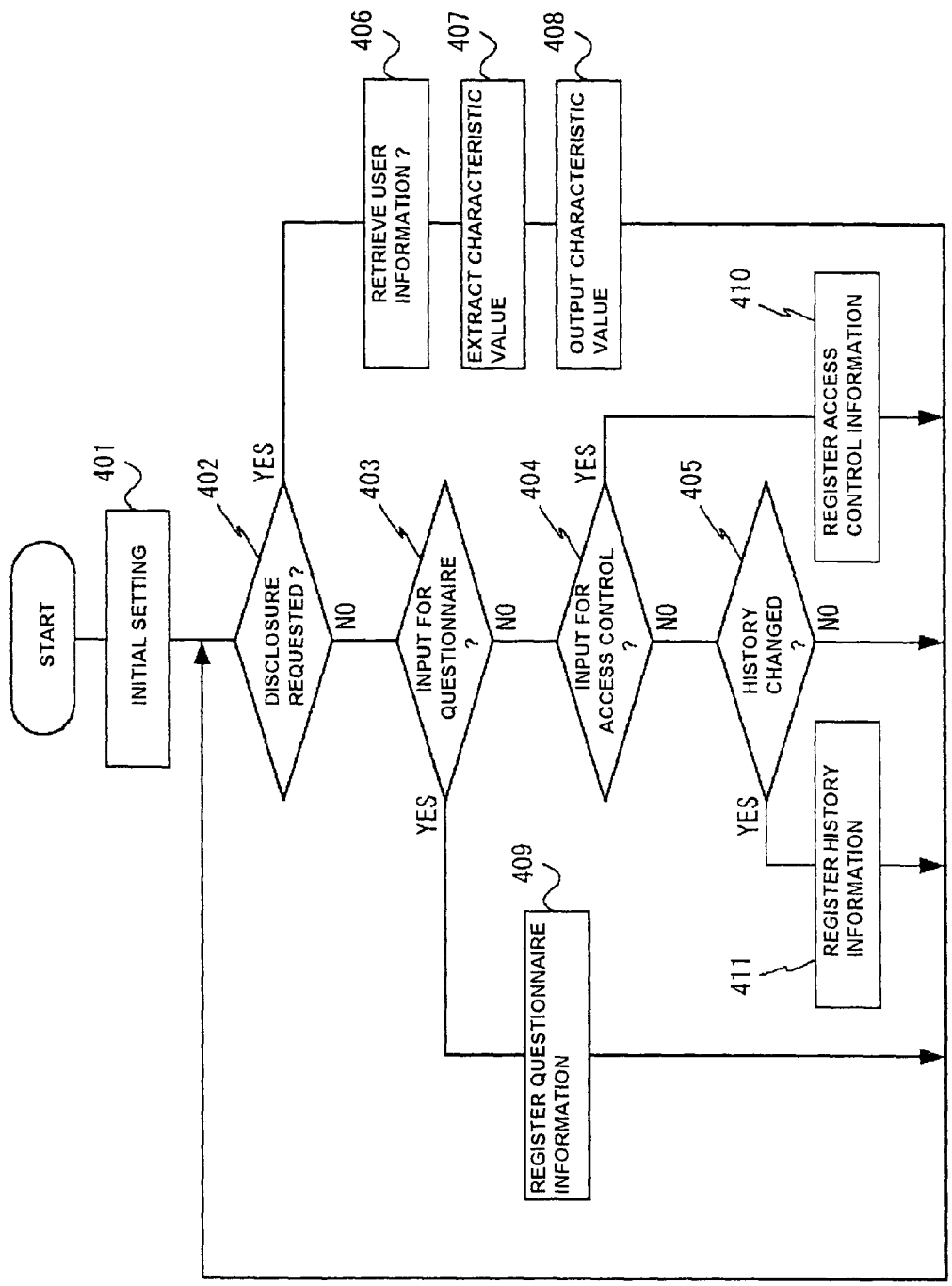
FIG. 12 is a flowchart showing the flow of the operation of the conversation supporting apparatus in FIG. 10.

The following section describes the operations of the conversation supporting apparatus 220 as an example of the operations of the conversation supporting apparatus 210, the conversation supporting apparatus 220, and the conversation supporting system 300. FIG. 12 is a flowchart showing the flow of the operations of the conversation supporting apparatus 220. Note that since the basic operations such as the detection of a visitor and the like in the conversation supporting apparatus 220 are similar to the processing described above referring to FIG. 3, description is not provided.

After the conversation supporting apparatus 220 starts the operation, the apparatus first conducts initial setting based on an operation of an administrator or the like (Step 401), and then, enters an input waiting loop (NO for Step 402, NO for Step 403, NO for Step 404, and NO for Step 405). This input waiting loop shown here is an example, and the sequence of the processing may not necessarily be the sequence shown in FIG. 12. This processing may be realized by interrupt processing and event processing using an event queue such as FIFO (First In First Out).

If an input is provided during the input waiting loop, and the input is a request for disclosing information on a certain user from the characteristic value selecting unit 227 (YES for Step 402), the characteristic value extracting unit 223 retrieves information on the subject user from the personal information storing unit 222 (Step 406), extracts the set characteristic value (Step 407), and outputs the extracted characteristic value through the output unit 224 (Step 408), and the procedure returns to the input waiting loop.

The following section describes a specific example for a case where disclosure of user information is requested.

FIG. 13 shows an example of personal information stored in the personal information storing unit 222. In the example in FIG. 13, the personal information includes age, sex, job type, questionnaire result, and visit history. Disclosing level can be set as access control information for the individual items of the information. There are four meeting places that can be visited, and therefore, four inputs are possible corresponding to the four meeting places with respect to the questionnaire results and the visit history, respectively. As for the questionnaire result, for example, "0" implies that an answer is not received yet, and "1" to "5" represent five-level evaluation scores answered by a user, and "1" is the lowest evaluation score and "5" is the highest evaluation score, for example. Of course, the evaluation is not limited to the five-level evaluation, and a seven-level evaluation, a point system with a hundred-point grading scale, or a free remark may be specified according to necessity. The visit history is graded such that a meeting place which one has not visited is graded as "0", and a meeting place which one has visited is graded as "1". The visit history may be set in terms of the time of visit, the time of exit, and the number of visits according to necessity in addition to whether one has visited or not. Also, the behavior history is not limited to the visit history. Instead, behavior patterns such as a travel speed, a period of stay and the like may be collected, and biological information such as body temperature, pulse rate, and eyes' movement may be collected as the behavior history. The access control information is set using levels; level "0" implies that the disclosure is possible unconditionally, "1" implies that the disclosure is possible for a personal terminal if disclosure is requested, and "2" implies that the disclosure is impossible without an access code, for example. Of course, the disclosure level may be finely specified for each user subject to disclosure. For example, the disclosure level may be indivisually specified so that "age" in the personal information on the user whose user ID is "0003" can be disclosed to the user whose user ID is "0001", and is not disclosed to the user whose user ID is "0002.". Alternatively, it may be specified according to the access code such that items at level 1 is disclosed only to a user who knows a first access code, and items at level 2 is disclosed only to a user who knows a second access code.

Now, it is assumed that the user whose user ID "0002" and who does not know the access code for the user whose user ID is "0003" requests for disclosure to see the information on the user whose user ID is "0003" from the personal portable terminal (input unit 229). In reply to the disclosure request, first, the personal information on the user whose user ID is "0003" is read out. Then, data that Job Type=R & D, Questionnaire Result=4, 3, 3, 4 are extracted as characteristic values. The results of disclosure are transferred to the portable terminal (output unit 224) of the user whose user ID is "0002", and the user whose user ID is "0002" knows that the user whose user ID is "0003" is in the research and development section, and evaluates the individual visited meeting places as 4, 3, 3, and 4 in the five-level scale.

If additional information such as information relating to the questionnaire is input during the input waiting loop (YES for Step 403), the personal information registering unit 228 adds the information to the personal information stored in the personal information storing unit 222 (Step 409), and the procedure returns to the input waiting loop.

The following section describes a specific example for a case where there is an input relating to questionnaire. It is assumed that a user whose user ID is "0005" performs an input for the questionnaire. The input of the questionnaire results is performed from the portable terminal 314 operating as the input unit 229. The screen 510 of the portable terminal 314 at this moment is shown in FIG. 14. The user selects and points to a register button 512 so as to input the questionnaire results after the user selects a desired answer on an answer selection menu 511.

For example, if the user whose user ID is "0005" inputs the questionnaire results that a Space 1 is evaluated as "3,", and a Space 4 is evaluated as "2", the results are transferred to the database managing server 302, and are written into the personal information database 312 used as the personal information storing unit 222 by the personal information registering unit 228 operating on the database managing server 302. Consequently, the personal information stored in the personal information storing unit 222 is updated as shown in FIG. 15. The apparatus may be constructed so that the input of the questionnaire results is limited. For example, the apparatus may be constructed so as to prevent a user from inputting the evaluation of a meeting place which the user has not visited by referring to the visit history of the user.

If information for the access control is input during the input waiting loop (YES for Step 404), the disclosure extent specifying unit 226 adds the information for the access control to the personal information stored in the personal information storing unit 222 (Step 410), and the procedure returns to the input waiting loop.

Figure 16:
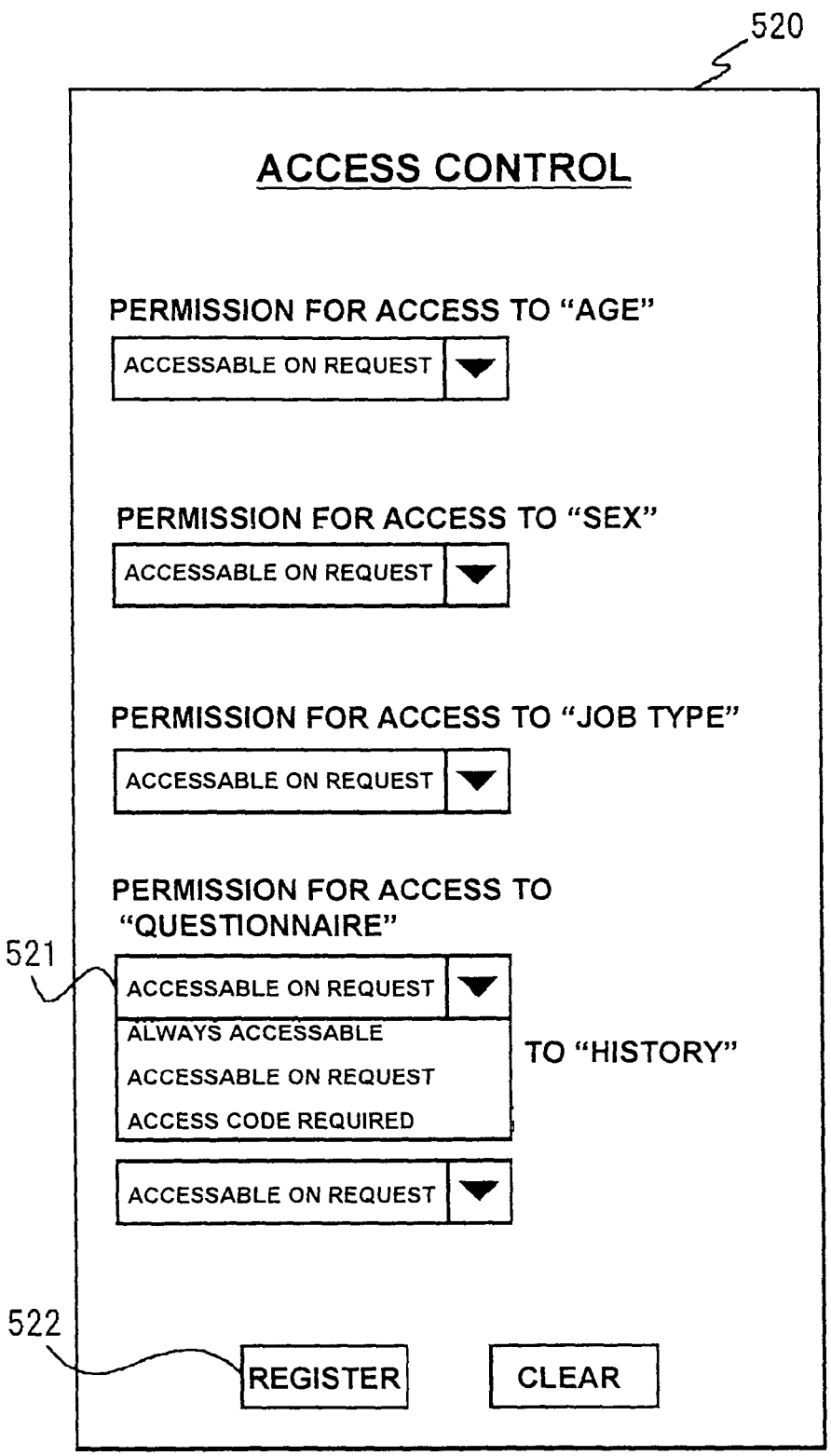
FIG. 16 shows an example of a screen for changing an access control method shown on the portable terminal in FIG. 11.

The following section describes a specific example of an input of information for the access control. It is assumed that the user whose user ID is "0002" changes the access control method for the item "Questionnaire" such that the access code is required for the access. This information can be entered from the portable terminal 314 operating as the input unit 229. At this moment, a screen 520 shown in FIG. 16 is present on the portable terminal 314, and the user selects and point to a register button 522 so as to change the access control method after the user selects a desired permission setting in a setting selection menu 521. This information is transferred from the portable terminal 314 to the database managing server 302, and is written into the personal information database 312 used as the personal information storing unit 222 by the disclosure extent specifying unit 226 operating on the database managing server 302. Consequently, the personal information stored in the personal information storing unit 222 is updated as shown in FIG. 17.

If new history information on a user is input during the input waiting loop (YES for Step 405), the person identifying unit 221 adds the history information to the personal information stored in the personal information storing unit 222 (Step 411), and the procedure returns to the input waiting loop.

The following section describes a specific example for a case where new history information is input. Supposing that the user whose user ID is "0001" moves to visit the Space 1, the sensor 311-1 operating as the person identifying unit 221 and the sensor managing server 301-1 disposed at the Space 1 detect a device carried by the user, and recognize that the device ID is "00:11:22:33:44:55". As a result, based on the table shown in FIG. 4, it is turned out that the user ID is "0001". Then, the user ID "0001" is transferred from the sensor managing server 301-1 at the Space 1 to the database managing server 302. The database managing server 302 receives this information, and replaces the data of a Visit History 1 for the user ID "0001" in the personal history stored in the personal information database 312 operating as the personal information storing unit 222 to "1", namely the data indicating visit, as shown in FIG. 18.

Note that, also in the second embodiment, personal information can be input to and output from the shared apparatus as well as it can be input to and output from the personal portable terminal 314 as in the first embodiment. In the case of using the shared apparatus, information is easily shared by using a large common screen such as a projector and a plasma display.

Also, the system may be configured such that only unconditionally disclosable data is displayed on the shared apparatus, and the information on the user ID of a user of interest is requested from a personal terminal such as a portable terminal.

Also, by finding a person having that user ID, and asking that person his/her access code directly, it is possible to obtain greater amount of information. This asking the access code directly may help to get the conversation.

Further, the system may be configured such that whether a person to whom one wants to talk to is within the same meeting place or not, or where that person exists is notified based on whereabouts information based on the visit history.

What is claimed is:

1. A conversation supporting apparatus for supporting face-to-face conversation among a plurality of participants in an occasion in which the participants participate, the apparatus comprising:

personal information storing unit that stores personal information including at least one characteristic value representing a characteristic of a participant;

person identifying unit that detects presence of a participant, and identifying the detected participant;

personal information retrieving unit that retrieves personal information on the participant identified by the person identifying unit from the personal information storing unit;

characteristic value extracting unit that extracts a predetermined characteristic value from the personal information retrieved by the personal information retrieving unit; and characteristic value outputting unit that outputs, based on a color predetermined for each attribution of the characteristic value, the characteristic value extracted from the personal information of the plurality of the participants by the characteristic value extracting unit as an average color corresponding to a number of participants each having a specific attribution of the characteristic value and displays the characteristic value to the plurality of participants to encourage direct face-to-face conversation in the presence of the plurality of participants.

2. The conversation supporting apparatus according to claim 1, wherein the characteristic value extracting unit extracts a characteristic value specified in advance from the personal information retrieved from the personal information storing unit.

3. The conversation supporting apparatus according to claim 1, further comprising:

disclosure control unit that sets availability of disclosure for individual characteristic values included in the personal information, wherein the characteristic value extracting unit extracts a characteristic value from the personal information retrieved from the personal information storing unit based on the availability of the disclosure set by the disclosure control unit.

4. The conversation supporting apparatus according to claim 1, further comprising:
   disclosure request unit that requests disclosure of individual characteristic values included in the personal information,
   wherein the characteristic value extracting unit extracts a characteristic value requested by the disclosure request unit from the personal information retrieved from the personal information storing unit.

5. The conversation supporting apparatus according to claim 1, further comprising:
   characteristic value registering unit provided for a participant to enter a characteristic value,
   wherein the personal information storing unit stores personal information including the characteristic value registered by the characteristic value registering unit.

6. The conversation supporting apparatus according to claim 1, further comprising:
   history registering unit that stores at least one of presence/absence, behavior, and biological information of the participant detected by the person identifying unit as history, and registering the stored history as a characteristic value,
   wherein the personal information storing unit stores the personal information including the characteristic value registered by the history registering unit.

7. A conversation supporting method for supporting face-to-face conversation among a plurality of participants in an occasion in which the participants participate, comprising:
   detecting presence of a participant;
   identifying the detected participant;
   retrieving personal information on the identified participant;
   extracting a predetermined characteristic value from the retrieved personal information; and
   outputting, based on a color predetermined for each attribution of the characteristic value, the characteristic value extracted from the personal information of the plurality of the participants as an average color corresponding to a number of participants each having a specific attribution of the characteristic value, and displaying the extracted characteristic value to the plurality of participants to encourage direct face-to-face conversation in the presence of the plurality of participants.

8. The conversation supporting method according to claim 7, wherein a characteristic value of a type specified in advance is extracted from the personal information as the characteristic value.

9. The conversation supporting method according to claim 7, wherein availability of disclosure for individual characteristic values included in the personal information is set, and a characteristic value is extracted from the personal information based on the set availability of the disclosure.

10. The conversation supporting method according to claim 7, wherein a characteristic value of a type requested by a participant is extracted from the personal information as the characteristic value.

11. The conversation supporting method according to claim 7, wherein the personal information includes a characteristic value entered by a participant.

12. The conversation supporting method according to claim 7, wherein the personal information includes behavior history generated based on at least one of presence, behavior, and biological information of the detected participant as a characteristic value.

13. A conversation supporting program for supporting face-to-face-conversation among participants in an occasion in which multiple participants participate, the program comprising:
   a person identifying step of identifying a participant detected by a detecting unit that detects presence of the participant;
   a personal information retrieving step of retrieving personal information on the participant identified by the person identifying step from a personal information storing unit that stores personal information including at least one characteristic value representing a characteristic of the participant;
   a characteristic value extracting step of extracting a predetermined characteristic value from the personal information retrieved by the personal information retrieving step; and
   a characteristic value outputting step of outputting, based on a color predetermined for each attribution of the characteristic value, the characteristic value extracted from the personal information of the plurality of the participants by the characteristic value extracting step as an average color corresponding to a number of participants each having a specific attribution of the characteristic value and displaying the characteristic value to the plurality of participants to encourage direct face-to-face conversation in the presence of the plurality of participants.

14. The conversation supporting program according to claim 13, wherein the characteristic value extracting step extracts a characteristic value specified in advance from the personal information retrieved from the personal information storing unit.

15. The conversation supporting program according to claim 13, further comprising:
   a disclosure control step of accepting availability setting of disclosure of individual characteristic values included in the personal information,
   wherein the characteristic value extracting step extracts a characteristic value from the personal information retrieved from the personal information storing unit based on the availability of the disclosure set by the disclosure control step.

16. The conversation supporting program according to claim 13, further comprising:
   a disclosure request step of accepting a request for disclosing individual characteristic values included in the personal information,
   wherein the characteristic value extracting step extracts the characteristic value requested by the disclosure request step from the personal information retrieved from the personal information storing unit.

17. The conversation supporting program according to claim 13, further comprising the step of a characteristic value registering step provided for the participant to enter a characteristic value.

18. The conversation supporting program according to claim 13, further comprising the step of a history registering step of storing at least one of presence/absence, behavior, and biological information of the participant detected by the detecting unit as history, and registering the stored history as a characteristic value.

19. A conversation supporting system for supporting face-to-face conversation among participants in an occasion in which multiple participants participate, comprising:
- a first apparatus including a person identifying unit that detects presence of a participant, and identifying the detected participant;
- a second apparatus including a personal information storing unit that stores personal information including at least one characteristic value representing a characteristic of a participant, a personal information retrieving unit that retrieves personal information of the participant identified by the person identifying unit from the personal information storing unit, and a characteristic value extracting unit that extracts a predetermined characteristic value from the personal information retrieved by the personal information retrieving unit; and
- a third apparatus including a characteristic value outputting unit that outputs, based on a color predetermined for each attribution of the characteristic value, the characteristic value extracted from the personal information of the plurality of the participants by the characteristic value extracting unit as an average color corresponding to a number of participants each having a specific attribution of the characteristic value and displays the characteristic value to the plurality of participants to encourage direct face-to-face conversation in the presence of the plurality of participants,
- wherein the first apparatus, the second apparatus and the third apparatus are connected to each other through a network that enables face-to-face conversation.

20. The conversation supporting system according to claim 19, wherein more than one first apparatus is connected with the network.

* * * * *